United States Patent
Nakado et al.

(10) Patent No.: US 10,549,601 B2
(45) Date of Patent: Feb. 4, 2020

(54) AIR CONDITIONING DEVICE FOR VEHICLE

(71) Applicant: MITSUBISHI HEAVY INDUSTRIES THERMAL SYSTEMS, LTD., Minato-ku, Tokyo (JP)

(72) Inventors: Koji Nakado, Aichi (JP); Nobuya Nakagawa, Aichi (JP); Tomohiko Shibata, Aichi (JP); Hirotsugu Kohigashi, Aichi (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 0 days.

(21) Appl. No.: 15/552,099

(22) PCT Filed: Aug. 19, 2015

(86) PCT No.: PCT/JP2015/073187
§ 371 (c)(1),
(2) Date: Aug. 18, 2017

(87) PCT Pub. No.: WO2016/151878
PCT Pub. Date: Sep. 29, 2016

(65) Prior Publication Data
US 2018/0037085 A1 Feb. 8, 2018

(30) Foreign Application Priority Data
Mar. 23, 2015 (JP) .................. 2015-059405

(51) Int. Cl.
*B60H 1/00* (2006.01)

(52) U.S. Cl.
CPC ..... *B60H 1/00571* (2013.01); *B60H 1/00514* (2013.01); *B60H 2001/006* (2013.01); *B60H 2001/00214* (2013.01)

(58) Field of Classification Search
CPC ............ B60H 1/00521; B60H 1/00514; B60H 2001/006; B60H 2001/00214; B60H 1/00571
See application file for complete search history.

(56) References Cited

U.S. PATENT DOCUMENTS

| 2006/0230774 A1* | 10/2006 | Shibata | B60H 1/00521 62/239 |
| 2012/0199661 A1* | 8/2012 | Hara | B60H 1/00528 236/92 B |

FOREIGN PATENT DOCUMENTS

| EP | 2708390 A1 | 3/2014 |
| JP | 2002-29251 A | 1/2002 |

(Continued)

OTHER PUBLICATIONS

International Search Report and Written Opinion of the International Searching Authority (Forms PCT/ISA/237 and PCT/ISA/210) for International Application No. PCT/JP2015/073187, dated Nov. 17, 2015, with English translations.

(Continued)

*Primary Examiner* — Ana M Vazquez
(74) *Attorney, Agent, or Firm* — Birch, Stewart, Kolasch & Birch, LLP.

(57) ABSTRACT

The present invention is provided with: an evaporator (6) in which a compressed refrigerant is vaporized; an expansion valve expanding the refrigerant before the refrigerant flows into the evaporator (6); refrigerant pipes (26, 27) that connect the evaporator (6) and the expansion valve to each other; and a unit case (3) housing the evaporator (6), the expansion valve, and the refrigerant pipes (26, 27), and including an air flow channel (4) for passing air through the evaporator (6). A refrigerant pipe housing chamber (31) is disposed in the unit case (3), and housing the refrigerant pipes (26, 27). The refrigerant pipe housing chamber (31) is (Continued)

partitioned while being isolated from the housing section for the evaporator (6) and the air flow channel (4). The outer circumferential surfaces of the refrigerant pipes (26, 27) are separated from the inner wall surface of the refrigerant pipe housing chamber (31). Furthermore, the thickness (t1) of the wall of the refrigerant pipe housing chamber (31) is greater than the thickness (t2) of the wall of the unit case (3).

11 Claims, 3 Drawing Sheets

(56) References Cited

FOREIGN PATENT DOCUMENTS

| | | |
|---|---|---|
| JP | 2004-42811 A | 2/2004 |
| JP | 2011-157002 A | 8/2011 |
| WO | WO 2012/153610 A1 | 11/2012 |

OTHER PUBLICATIONS

Japanese Office Action for Japanese Application No. 2015-059405, dated Apr. 5, 2016, with an English translation.

* cited by examiner

AIR CONDITIONING DEVICE FOR VEHICLE

TECHNICAL FIELD

The present invention relates to vehicular air conditioning devices, and more particularly, to a vehicular air conditioning device in which the flow sound of a refrigerant flowing through the inside of a metal pipe connected to an evaporator is reduced.

BACKGROUND ART

Patent Document 1 discloses a vehicular air conditioning device called a heating, ventilation, and air conditioning unit (HVAC unit) mounted in the dashboard of a vehicle. This device includes a resin unit case housing an evaporator. In the unit case, an expansion valve and the evaporator are connected to each other via refrigerant pipes having hose parts made from an elastically deformable material.

Since the refrigerant pipes used for connection between the expansion valve and the evaporator are made from an elastically deformable material, the elasticity of the elastic material composing the refrigerant pipes damps and suppresses the flow sound of a refrigerant flowing through the inside of the refrigerant pipes, resulting in enhancement of the quietness of the vehicular air conditioning device.

CITATION LIST

Patent Document

Patent Document 1: Japanese Unexamined Patent Application Publication No. 2004-42811A

SUMMARY OF INVENTION

Technical Problems

Unfortunately, making the refrigerant pipes disposed in the unit case from an elastically deformable material increases the manufacturing cost. Thus, uncovered metal refrigerant pipes are often disposed in the unit case. With this configuration, the flow sound of a refrigerant flowing through the inside of the refrigerant pipes is heard as harsh noise on the vehicular seat side through an air blowing duct open in the unit case, especially at start-up of a refrigerant compressor compressing the refrigerant.

Furthermore, since air heated by solar radiation or air at normal temperature passes through the unit case, the uncovered metal refrigerant pipes disposed in the unit case are heated by the air, resulting in a reduction in air conditioning efficiency. The refrigerant pipes in the unit case may be covered with a covering material made from a foamed material having sound insulating and thermal insulating properties; however, it takes time for such manufacture, and the manufacturing cost thus increases.

In the light of the foregoing, an object of the present invention is to provide a vehicular air conditioning device that has a simple, inexpensive configuration and can prevent the flow sound of a refrigerant flowing through the inside of refrigerant pipes connecting an expansion valve and an evaporator to each other from traveling on the vehicular seat side, thereby enhancing the quietness of the vehicular air conditioning device.

Solution to Problem

To solve the above-described problem, the present invention provides the following means.

A vehicular air conditioning device according to the present invention includes: an evaporator in which a compressed refrigerant is vaporized; an expansion valve expanding the refrigerant before the refrigerant flows into the evaporator; a refrigerant pipe connecting the evaporator and the expansion valve to each other; a unit case housing the evaporator, the expansion valve, and the refrigerant pipe and including an air flow channel configured to pass through the evaporator; and a refrigerant pipe housing chamber disposed in the unit case and housing the refrigerant pipe, the refrigerant pipe housing chamber being partitioned while being isolated from a housing section for the evaporator and the air flow channel.

With the above-described configuration, in the unit case, the refrigerant pipe is housed in the refrigerant pipe housing chamber partitioned while being isolated from the housing section for the evaporator and the air flow channel. This configuration enables the flow sound of the refrigerant flowing through the inside of the refrigerant pipe to be blocked double with the wall forming the refrigerant pipe housing chamber and the wall of the unit case, and thus enables the flow sound to be difficult to travel on the seat side. Accordingly, the quietness of the vehicular air conditioning device can be enhanced.

In the above-described configuration, the refrigerant pipe preferably includes an outer circumferential surface separated from an inner wall surface of the refrigerant pipe housing chamber. This configuration allows an air space to be interposed between the refrigerant pipe and the wall forming the refrigerant pipe housing chamber and thus enables the flow sound of the refrigerant flowing through the inside of the refrigerant pipe to be difficult to travel to the wall forming the refrigerant pipe housing chamber. Furthermore, vibration of the refrigerant pipe does not travel to the unit case. Accordingly, the quietness of the vehicular air conditioning device can be further enhanced.

In the above-described configuration, the refrigerant pipe housing chamber preferably includes a wall having a thickness greater than a thickness of a wall of the unit case. This configuration increases the effect of blocking the flow sound of the refrigerant flowing through the inside of the refrigerant pipe with the wall of the refrigerant pipe housing chamber and can thus further enhance the quietness of the vehicular air conditioning device.

In the above-described configuration, the refrigerant pipe housing chamber may house the expansion valve together with the refrigerant pipe. This configuration enables the flow sound of the refrigerant flowing through the inside of the expansion valve to be also blocked with the wall of the refrigerant pipe housing chamber and can thus further enhance the quietness of the vehicular air conditioning device.

In the above-described configuration, the refrigerant pipe housing chamber may have a divided structure including a plurality of divided members, at least one of the plurality of divided members being formed integrally with a component of the unit case. By integrating at least one component forming the refrigerant pipe housing chamber with a component of the unit case, the number of components forming the refrigerant pipe housing chamber is reduced, resulting in a simple, inexpensive configuration.

Advantageous Effects of Invention

As described above, the vehicular air conditioning device according to the present embodiment has a simple, inexpensive configuration and can prevent the flow sound of the refrigerant flowing through the inside of the refrigerant pipe connecting the expansion valve and the evaporator to each other from traveling on the vehicular seat side, thereby enhancing the quietness of the vehicular air conditioning device.

DESCRIPTION OF EMBODIMENTS

Embodiments of the present invention will now be described with reference to the drawings.

Figure 1:
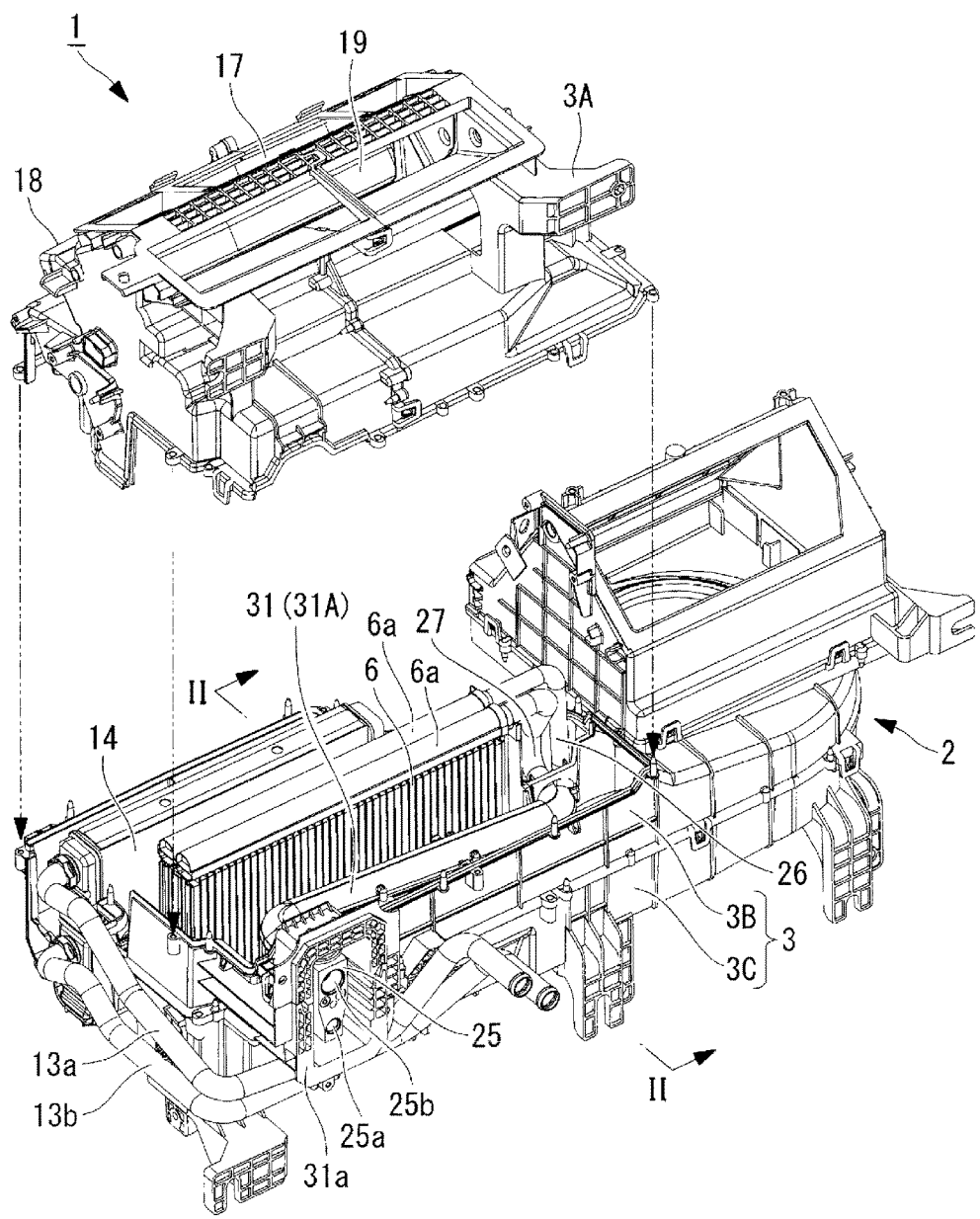
FIG. 1 is an exploded perspective view of a vehicular air conditioning device according to an embodiment of the present invention.
Figure 2:
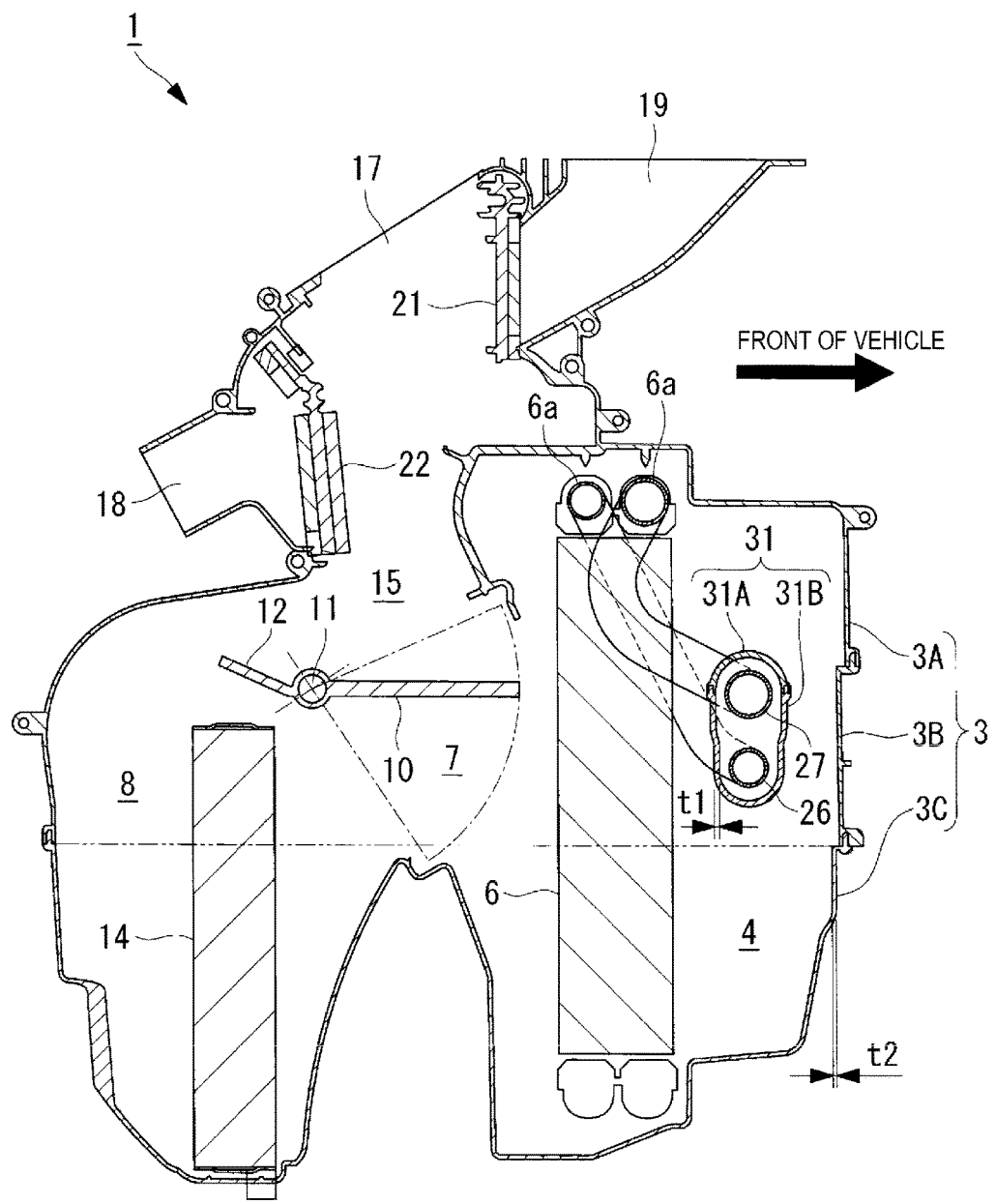
FIG. 2 is a vertical cross-sectional view of the vehicular air conditioning device taken along the line II-II in FIG. 1.

FIG. 1 is an exploded perspective view of a vehicular air conditioning device according to an embodiment of the present invention, and FIG. 2 is a vertical cross-sectional view taken along the line II-II in FIG. 1. The right side in FIG. 2 is a front side of a vehicle, and the left side thereof is a seat side of the vehicle.

The vehicular air conditioning device (HVAC unit) 1 is mounted in the dashboard of the vehicle and includes a unit case 3 made from resin and integrally provided with a blower unit 2, illustrated in FIG. 1, at one end portion. The unit case 3 is, for example, divided vertically into a plurality of sections and includes an upper case 3A defining an upper section, a middle case 3B defining an intermediate section, and a lower case 3C defining a lower section. An air flow channel 4 (see FIG. 2) is formed in the unit case 3, and changes the direction of the flow of air blown from the blower unit 2 to the front-rear direction (the horizontal direction in FIG. 2) and allows the air to flow downstream.

An evaporator 6 composing a refrigerant cycle (not illustrated) is disposed substantially vertically in an upstream section of the air flow channel 4. The evaporator 6 is supplied with a refrigerant compressed by a refrigerant compressor (not illustrated) from an expansion valve 25 and high- and low-pressure refrigerant pipes 26, 27, which will be described later. The air flow channel 4 branches into a bypass flow channel 7 and a heating flow channel 8 on the downstream side of the evaporator 6.

An air mixing damper 10 is disposed at the branching part of the bypass flow channel 7 and the heating flow channel 8 and pivotally supported by a rotating shaft 11. The air mixing damper 10 is integrally provided with a sub-damper 12 with the rotating shaft 11 interposed therebetween. A heater core 14 is disposed substantially vertically in the heating flow channel 8, and an engine cooling fluid passes through the heater core 14 via engine cooling fluid pipes 13a, 13b illustrated in FIG. 1.

The bypass flow channel 7 and the heating flow channel 8 join each other in an air mixing region 15 located downstream of the air mixing damper 10 and communicate with three outlet flow channels consisting of a face outlet flow channel 17, a foot outlet flow channel 18, and a defroster outlet flow channel 19 that are formed downstream of the air mixing region 15. A defroster/face damper 21 for changing the air delivery mode is disposed between the face outlet flow channel 17 and the defroster outlet flow channel 19. A foot damper 22 for changing the air delivery mode is disposed at the entrance of the foot outlet flow channel 18.

In a cooling operation mode, the compressed refrigerant supplied to the evaporator 6 vaporizes to cool the evaporator 6, and air coming from the blower unit 2 via the air flow channel 4 passes through the evaporator 6 to exchange heat with the evaporator 6 and is thus cooled. The pivoting position of the air mixing damper 10 (12) is adjusted so that most of the cooled air is blown out from the three outlet flow channels 17, 18, 19.

In a heating operation mode, the pivoting position of the air mixing damper 10 (12) is adjusted so that the greater part of air passing through the air flow channel 4 passes through the heater core 14, and the air exchanges heat with the heater core 14 to be heated and is then blown out from the three outlet flow channels 17, 18, 19. The temperature of the air blown out from the three outlet flow channels 17, 18, 19 is adjusted in accordance with the pivoting positions of the air mixing damper 10 and sub-damper 12 pivoting about the rotating shaft 11.

The unit case 3 houses the expansion valve 25 (see FIG. 1) that expands the compressed refrigerant before the compressed refrigerant flows into the evaporator 6, and the high-pressure refrigerant pipe 26 (refrigerant pipe) and the low-pressure refrigerant pipe 27 (refrigerant pipe) that connect the expansion valve 25 and the evaporator 6 to each other. The expansion valve 25 is provided with a high-pressure port 25a and a low-pressure port 25b. The high-pressure port 25a is connected to a high-pressure refrigerant supply pipe (not illustrated) that supplies the high-pressure refrigerant compressed by the refrigerant compressor (not illustrated), and the low-pressure port 25b is connected to a low-pressure refrigerant return pipe (not illustrated) that returns the refrigerant to the refrigerant compressor.

The expansion valve 25 is disposed, for example, in front of the evaporator 6. The high-pressure refrigerant pipe 26 and low-pressure refrigerant pipe 27 extend rearward from the expansion valve 25, bend at an angle of 90 degrees, horizontally extend in front of the evaporator 6, then bend upward, and connect to header pipes 6a provided along the upper side of the evaporator 6.

The compressed refrigerant supplied to the high-pressure port 25a of the expansion valve 25 is decompressed at the expansion valve 25, then passes through the high-pressure refrigerant pipe 26, flows into the evaporator 6, vaporizes in the evaporator 6 as described above to cool the evaporator 6, thereafter passes through the low-pressure refrigerant pipe 27, and returns to the refrigerant compressor via the expansion valve 25 (low-pressure port 25b) again.

A refrigerant pipe housing chamber 31 is provided in the unit case 3. The refrigerant pipe housing chamber 31 houses the expansion valve 25, the high-pressure refrigerant pipe 26, and the low-pressure refrigerant pipe 27 and is partitioned as a separate chamber isolated from the housing section for the evaporator 6 and the air flow channel 4.

Specifically, the refrigerant pipe housing chamber 31 is formed into a substantially pipe-like shape while horizontally extending in front of the evaporator 6, and has a divided structure that is divided into upper and lower portions in the longitudinal direction of the horizontal portions of the high-pressure refrigerant pipe 26 and low-pressure refrigerant pipe 27 and that includes an upper cover 31A and a lower cover 31B. The high-pressure refrigerant pipe 26 and low-pressure refrigerant pipe 27 arranged one above the other are housed in the refrigerant pipe housing chamber 31. A box-shaped expansion valve housing part 31a (see FIG. 1)

for housing the expansion valve 25 is formed at the refrigerant pipe housing chamber 31 and the middle case 3B.

At least one of a plurality of divided members composing the refrigerant pipe housing chamber 31, that is, the upper cover 31A and lower cover 31B, may be formed integrally with the upper case 3A, middle case 3B, lower case 3C, or the like composing the unit case 3. In the present embodiment, for example, the lower cover 31B is formed integrally with the middle case 3B; however, for example, the upper cover 31A may be formed integrally with the upper case 3A.

As illustrated in FIG. 2, the thickness t1 of the walls of the refrigerant pipe housing chamber 31 (31A, 31B) is approximately from 1.5 to 2.0 times as thick as the thickness t2 of the walls of the unit case 3 (3A, 3B, 3C). For example, if the unit case 3 has a thickness t2 of approximately from 1.3 to 1.5 mm, the refrigerant pipe housing chamber 31 (31A, 31B) has a thickness t1 of approximately from 2.0 to 3.0 mm.

In the refrigerant pipe housing chamber 31, the high-pressure refrigerant pipe 26 and low-pressure refrigerant pipe 27 are arranged so that the outer circumferential surfaces thereof are separated from the inner wall surface of the refrigerant pipe housing chamber 31. That is, the radial dimension of the inner space of the refrigerant pipe housing chamber 31 formed like a pipe is greater than the outer diameters of the high-pressure refrigerant pipe 26 and low-pressure refrigerant pipe 27, and the high- and low-pressure refrigerant pipes 26, 27 are disposed in the vicinity of the center of the inner space.

Gaps between the outer circumferential surfaces of the high- and low-pressure refrigerant pipes 26, 27 and the inner wall surface of the refrigerant pipe housing chamber 31 are, for example, approximately several millimeters in order to prevent the vibrating or oscillating high- and low-pressure refrigerant pipes 26, 27 from coming into contact with the inner wall surface of the refrigerant pipe housing chamber 31. A sound absorbing material, buffer material, thermal insulating material, or the like may be added between the inner wall surface of the refrigerant pipe housing chamber 31 and the high- and low-pressure refrigerant pipes 26, 27.

The upper half of the expansion valve housing part 31a for housing the expansion valve 25 is formed integrally with the upper cover 31A of the refrigerant pipe housing chamber 31. If the upper cover 31A is removed, the upper portion of the expansion valve 25 is uncovered. To remove the evaporator 6 for component replacement or maintenance, the upper case 3A of the unit case 3 and the upper cover 31A of the refrigerant pipe housing chamber 31 are removed. This process uncovers the upper portions of the evaporator 6, expansion valve 25, and high- and low-pressure refrigerant pipes 26, 27 and allows the evaporator 6 to be taken out together with the expansion valve 25 and high- and low-pressure refrigerant pipes 26, 27.

The vehicular air conditioning device 1 having the above-described configuration includes the unit case 3 in which the refrigerant pipe housing chamber 31 is partitioned while being isolated from the housing section for the evaporator 6 and the air flow channel 4. The high-pressure refrigerant pipe 26 and low-pressure refrigerant pipe 27 connecting the expansion valve 25 and the evaporator 6 to each other are housed in the refrigerant pipe housing chamber 31.

The high- and low-pressure refrigerant pipes 26, 27 are housed in the refrigerant pipe housing chamber 31 partitioned while being isolated from the housing section for the evaporator 6 and the air flow channel 4. This configuration enables the flow sound of the refrigerant flowing through the inside of the high- and low-pressure refrigerant pipes 26, 27 to be blocked double with the wall forming the refrigerant pipe housing chamber 31 and the wall of the unit case 3, and thus enables the flow sound to be difficult to travel on the vehicular seat side. Accordingly, the quietness of the vehicular air conditioning device 1 can be enhanced.

Figure 3:
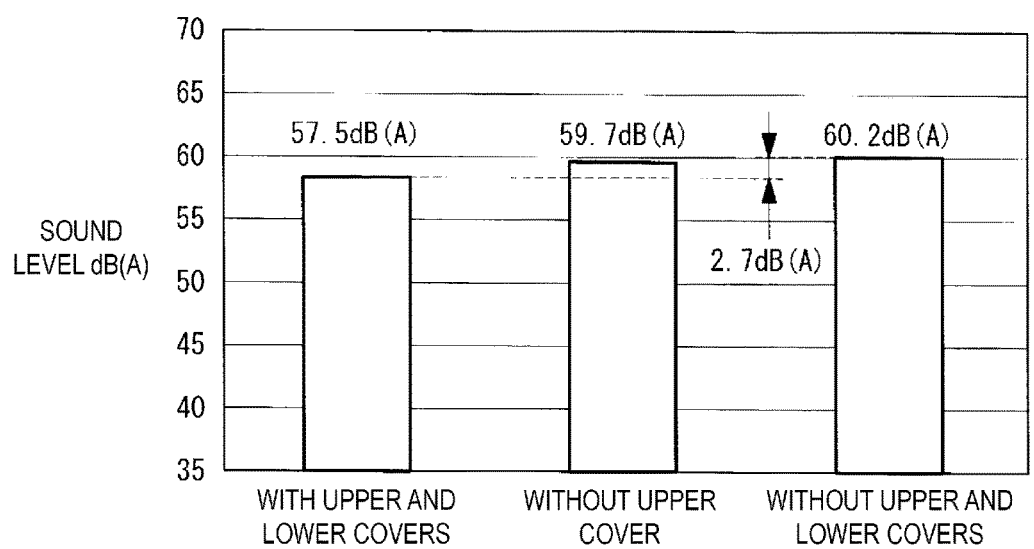
FIG. 3 is a graph showing results of measuring a refrigerant flow sound at start-up of a refrigerant compressor of the vehicular air conditioning device to which the present invention is applied.

FIG. 3 is a graph showing results of measuring the flow sound of the refrigerant in the vehicular seat at start-up of the refrigerant compressor compressing the refrigerant. When the upper cover 31A and lower cover 31B composing the refrigerant pipe housing chamber 31 were present, the start-up sound was 57.5 dB(A). When the upper cover 31A was absent, the start-up sound was 59.7 dB(A). When the upper and lower covers 31A, 31B were absent, the start-up sound was 60.2 dB(A). That is, a result was obtained that the quietness increased by 2.7 dB(A) when the upper and lower covers 31A, 31B were present in comparison with when the upper and lower covers 31A, 31B were absent.

Since the outer circumferential surfaces of the high- and low-pressure refrigerant pipes 26, 27 are separated from the inner wall surfaces of the refrigerant pipe housing chamber 31 (31A, 31B), an air space is interposed between the high- and low-pressure refrigerant pipe 26, 27 and the wall forming the refrigerant pipe housing chamber 31. This configuration enables the flow sound of the refrigerant flowing through the inside of the high- and low-pressure refrigerant pipes 26, 27 to be difficult to travel to the wall forming the refrigerant pipe housing chamber 31. Furthermore, vibration of the high- and low-pressure refrigerant pipes 26, 27 does not travel to the unit case 3. Accordingly, the quietness of the vehicular air conditioning device 1 can be further enhanced.

Moreover, since the thickness t1 of the walls of the refrigerant pipe housing chamber 31 (31A, 31B) is greater than the thickness t2 of the wall of the unit case 3, the effect of blocking the flow sound of the refrigerant flowing through the inside of the high- and low-pressure refrigerant pipes 26, 27 with the walls of the refrigerant pipe housing chamber 31 is increased. Accordingly, the quietness of the vehicular air conditioning device 1 can be further enhanced.

Since the refrigerant pipe housing chamber 31 houses the expansion valve 25 together with the high- and low-pressure refrigerant pipes 26, 27, the flow sound of the refrigerant flowing through the inside of the expansion valve 25 is also blocked with the wall of the refrigerant pipe housing chamber 31. This also results in enhancement of the quietness of the vehicular air conditioning device 1.

The refrigerant pipe housing chamber 31 has a divided structure, and one of the divided members, for example, the lower cover 31B is formed integrally with the middle case 3B composing the unit case 3. By integrating a component forming the refrigerant pipe housing chamber 31 with a component of the unit case 3, the number of components forming the refrigerant pipe housing chamber 31 is reduced, resulting in a simple, inexpensive configuration.

As described above, the vehicular air conditioning device 1 according to the present embodiment has a simple, inexpensive configuration and can prevent the flow sound of the refrigerant flowing through the inside of the high-pressure refrigerant pipe 26 and low-pressure refrigerant pipe 27 connecting the expansion valve 25 and the evaporator 6 to each other from traveling on the vehicular seat side, thereby enhancing the quietness of the vehicular air conditioning device 1.

The present invention is not limited only to the configuration of the above-described embodiment, and changes and modifications may be made as appropriate. Embodiments having such changes and modifications are included in the scope of claims of the present invention.

For example, the positional relationship between the evaporator 6 and the high- and low-pressure refrigerant pipes 26, 27 in the unit case 3, the structure of the refrigerant pipe housing chamber 31, and the like are not limited to those in the present embodiment.

The present embodiment has exemplified a case in which the present invention is applied to the vehicular air conditioning device 1 mounted in the dashboard of a vehicle; however, for example, the present invention can also be applied to a vehicular air conditioning device installed in the vicinity of the rear seat or roof of a vehicle.

REFERENCE SIGNS LIST

1 Vehicular air conditioning device
3 Unit case
3B Middle case (Component of unit case)
4 Air flow channel
6 Evaporator
25 Expansion valve
26 High-pressure refrigerant pipe (Refrigerant pipe)
27 Low-pressure refrigerant pipe (Refrigerant pipe)
31 Refrigerant pipe housing chamber
31A Upper cover (Divided member of refrigerant pipe housing chamber)
31B Lower cover (Divided member of refrigerant pipe housing chamber)
t1 Thickness of wall of refrigerant pipe housing chamber
t2 Thickness of wall of unit case

The invention claimed is:

1. A vehicular air conditioning device comprising:
an evaporator in which a refrigerant that is compressed is vaporized;
an expansion valve expanding the refrigerant before the refrigerant flows into the evaporator;
a refrigerant pipe connecting the evaporator and the expansion valve to each other;
a unit case housing the evaporator, the expansion valve, and the refrigerant pipe and comprising an air flow channel configured to pass air through the evaporator; and
a refrigerant pipe housing chamber disposed in the unit case and housing the refrigerant pipe,
the refrigerant pipe housing chamber being partitioned while being isolated from a housing section for the evaporator and the air flow channel; and
the refrigerant pipe housing chamber comprising a wall surface separated inward away from a wall surface of the unit case facing the wall surface of the refrigerant pipe housing chamber.

2. The vehicular air conditioning device according to claim 1, wherein the refrigerant pipe comprises an outer circumferential surface separated from an inner wall surface of the refrigerant pipe housing chamber.

3. The vehicular air conditioning device according to claim 2, wherein the refrigerant pipe housing chamber comprises a wall having a thickness greater than a thickness of a wall of the unit case.

4. The vehicular air conditioning device according to claim 2, wherein the refrigerant pipe housing chamber houses the expansion valve together with the refrigerant pipe.

5. The vehicular air conditioning device according to claim 2, wherein the refrigerant pipe housing chamber has a divided structure comprising a plurality of divided members, at least one of the plurality of divided members being formed integrally with a component of the unit case.

6. The vehicular air conditioning device according to claim 1, wherein the refrigerant pipe housing chamber comprises a wall having a thickness greater than a thickness of a wall of the unit case.

7. The vehicular air conditioning device according to claim 6, wherein the refrigerant pipe housing chamber houses the expansion valve together with the refrigerant pipe.

8. The vehicular air conditioning device according to claim 6, wherein the refrigerant pipe housing chamber has a divided structure comprising a plurality of divided members, at least one of the plurality of divided members being formed integrally with a component of the unit case.

9. The vehicular air conditioning device according to claim 1, wherein the refrigerant pipe hot sing chamber houses the expansion valve together with the refrigerant pipe.

10. The vehicular air conditioning device according to claim 9, wherein the refrigerant pipe housing chamber has a divided structure comprising a plurality of divided members, at least one of the plurality of divided members being formed integrally with a component of the unit case.

11. The vehicular air conditioning device according to claim 1, wherein the refrigerant pipe housing chamber has a divided structure comprising a plurality of divided members, at least one of the plurality of divided members being formed integrally with a component of the unit case.

* * * * *